(12) United States Patent
Furmanski et al.

(10) Patent No.: US 6,263,883 B1
(45) Date of Patent: Jul. 24, 2001

(54) INTERCHANGE APPARATUS FOR A PNEUMATIC CONVEYING SYSTEM

(75) Inventors: Horst Furmanski; Jörg Lüneburg; Olaf Colditz, all of Berlin (DE)

(73) Assignee: Philip Morris Incorporated, New York, NY (US)

( * ) Notice: Subject to any disclaimer, the term of this patent is extended or adjusted under 35 U.S.C. 154(b) by 0 days.

(21) Appl. No.: 09/068,194

(22) PCT Filed: Oct. 31, 1996

(86) PCT No.: PCT/EP96/04742

§ 371 Date: Aug. 2, 1999

§ 102(e) Date: Aug. 2, 1999

(87) PCT Pub. No.: WO97/16365

PCT Pub. Date: May 9, 1997

(30) Foreign Application Priority Data

Nov. 2, 1995 (EP) .................................................. 95117242

(51) Int. Cl.[7] ................ A24C 5/32; A24C 5/33
(52) U.S. Cl. .............. 131/282; 131/84.3; 198/367; 198/442; 406/2; 406/50; 406/86; 406/96; 406/117; 406/183
(58) Field of Search .................. 131/84.3, 282; 198/367, 442; 406/2, 50, 86, 96, 117, 183; 493/39, 48; 264/DIG. 48

(56) References Cited

U.S. PATENT DOCUMENTS 3,019,741    2/1962   Bishop et al. .
3,139,932 *  7/1964   Johnson .
3,789,744 *  2/1974   Wahle .
3,860,031 *  1/1975   Grilli .
5,441,142 *  8/1995   Schneider .

FOREIGN PATENT DOCUMENTS

| 470307 | 1/1929 | (DE) . | |
| 1026242 | 3/1958 | (DE) . | |
| WO 99/22611 | 5/1999 | (EP) | A24C/5/32 |
| 2085337 | 12/1971 | (FR) . | |
| 2094269 | 2/1972 | (FR) . | |
| 96/04742 | 2/1997 | (WO) . | |
| WO 97/16365 | 5/1997 | (WO) | B65G/51/24 |

OTHER PUBLICATIONS

EP 95 11 7242, Search Report.

* cited by examiner

Primary Examiner—Michael P. Colaianni
(74) Attorney, Agent, or Firm—Clinton H. Hallman, Jr.; Kevin B. Osborne; Charles E. B. Glenn

(57) ABSTRACT

An interchange apparatus for a pneumatic conveying system including a plurality of branch tubes joined together at an acute angle in an interchange chamber to form a main tube and a flap positioned between at least two branch tubes of the plurality of branch tubes at the end of the interchange chamber, the flap faces the branch tubes and is swivelable between a first position and a second position. The flap is held in each position by a holding device such that when the flap is positioned in the first position there is a connection between a first branch tube and the main tube, and when the flap is positioned in a second position there is a connection between a second branch tube and the main tube. In one embodiment the flap is switched from a first position to a second position by the passage of the cylindrical objects through the interchanges.

7 Claims, 4 Drawing Sheets

INTERCHANGE APPARATUS FOR A PNEUMATIC CONVEYING SYSTEM

Figure 1:
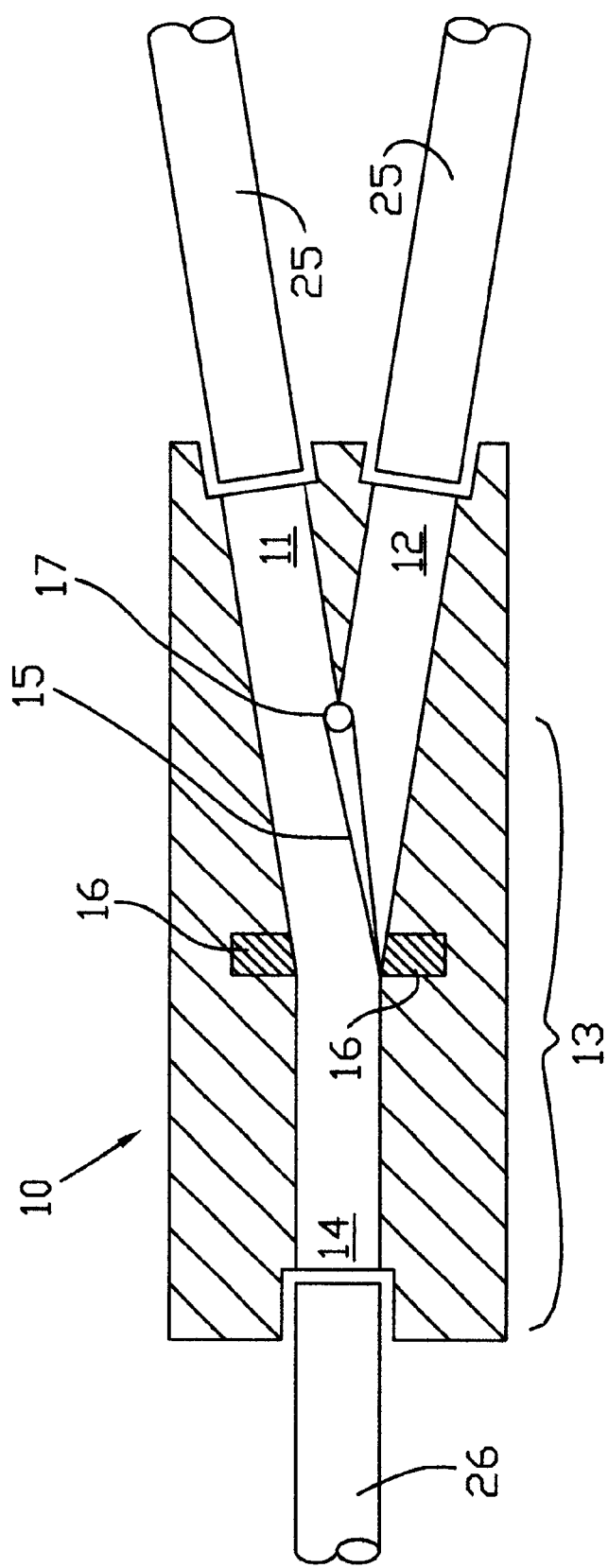

The invention relates to an interchange for a pneumatic conveying system. The interchange has two branch tubes that join together at an acute angle in an interchange chamber to form a main tube as well as a flap that is positioned between the two branch tubes at the end of the interchange chamber facing said branch tubes and that can be swiveled between two positions, whereby it is the case that a connection is always established between only one of the branch tubes and the main tube.

Such interchanges are used, for example, in pneumatic tube conveying systems. In order to swivel the flap, there are switch-over mechanisms connected to power and control lines.

The invention is based on the objective of simplifying the installation and operation of such an interchange.

According to the invention, this objective is achieved in that the flap is held in either one of the two positions with a defined force.

The filter feed interchange can be an active interchange, in which case the main tube is the inlet tube and the two branch tubes are the outlet tubes for the product stream. In order to effectuate the switch-over of the flaps, there are pneumatic cylinders on both sides at the end of the flap facing the main or inlet tube, and said cylinders switch over the flap, over-coming the holding force.

In the embodiment as a passive interchange, the two branch tubes are the inlet tubes and the main tube is the outlet tube. In this case, there are no means to effectuate a forced switch-over of the flap and the holding force has to be dimensioned in such a way that the flap is switched over by the air pressure generated in the branch tube that is in the process of conveying the products at a given time and by the incoming product stream itself. Due to this passive control of the flap, there is no longer a need to lay power and control lines to where the interchange has been installed.

The defined holding force is preferably generated by holding magnets that act upon the flap at its two end positions.

The interchange according to the invention is especially suitable for a conveying system through which cigarette filter plugs from one of several filter plug makers are conveyed to one of several filter assemblers. Via one or more consecutively arranged active interchanges according to the invention, the filter plugs from one filter plug maker can be conveyed to a specific machine among a number of filter assemblers and conversely, via one or more consecutively arranged passive interchanges according to the invention, the filter plugs from any desired number of filter plug makers can be fed to one specific filter assembler.

In the case of passive interchanges, in order to prevent a pressure drop via the branch tube that is not in use at a given time, there are shut-off valves, preferably in the conveying segments leading from the filter plug makers to the interchange. These shut-off valves prevent a product stream from unintentionally coming from the branch tube that is not in use at a given time. Simultaneous product streams from both branch tubes would inevitably cause obstruction of the interchange and block it.

The shut-off valves are installed separately from the interchanges. Their configuration can be selected in such a way that the distances that the auxiliary power and control lines have to cover are kept as short as possible. Therefore, the shut-off valves are preferably installed in the immediate vicinity of the filter plug makers.

Shut-off valves can also be installed in the branch tubes in order to prevent pressure losses.

For technical reasons, the production of filter cigarettes can be set up in such a way that the filters are made in a different place from the cigarette production. The cigarette filters are pneumatically conveyed in the form of filter plugs having a length of four to six cigarette filters through feed tubes to the filter assemblers that are part of the cigarette production installation. Large-scale cigarette production installations can have 50 or more such feed tubes. Depending on the production capacity of a cigarette machine, it is supplied with filter plugs from several feed tubes. The filter plugs produced by a filter plug maker are conveyed by means of special filter feed devices having several, for example, up to 10 feed tubes. If one of the filter plug makers or filter feed devices fails, then the connected cigarette machine does not receive enough filters. Conversely, if a cigarette machine fails, then the filter plug maker supplying said cigarette machine would have to be switched off. In order to avoid such production gaps in the cigarette machine as well as the inevitable switching off of the filter plug maker, the feed tubes pass through an interchange segment in which the link between the filter plug maker and the cigarette machine can be changed by manually switching over the feed tubes. However, the manual switching over of the feed tube is not only time-consuming, but is also easily leads to mix-ups.

The active and passive interchanges according to the invention are especially suitable for use in the device employed to flexibly supply several cigarette machines with filter plugs according to the simultaneously filed German utility model application (our reference 30588—designation: "Device for flexibly supplying several cigarette machines with filter plugs").

Figure 2:
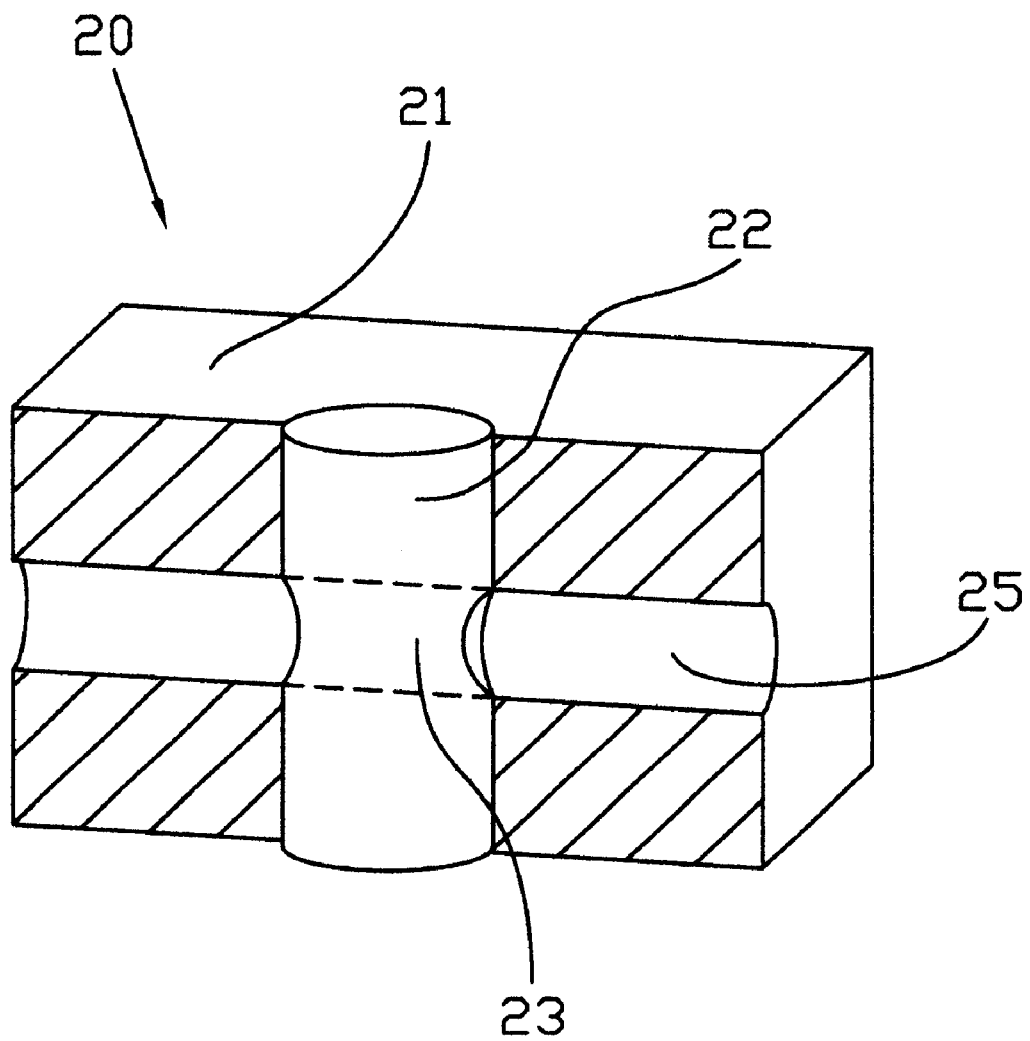
Figure 3:
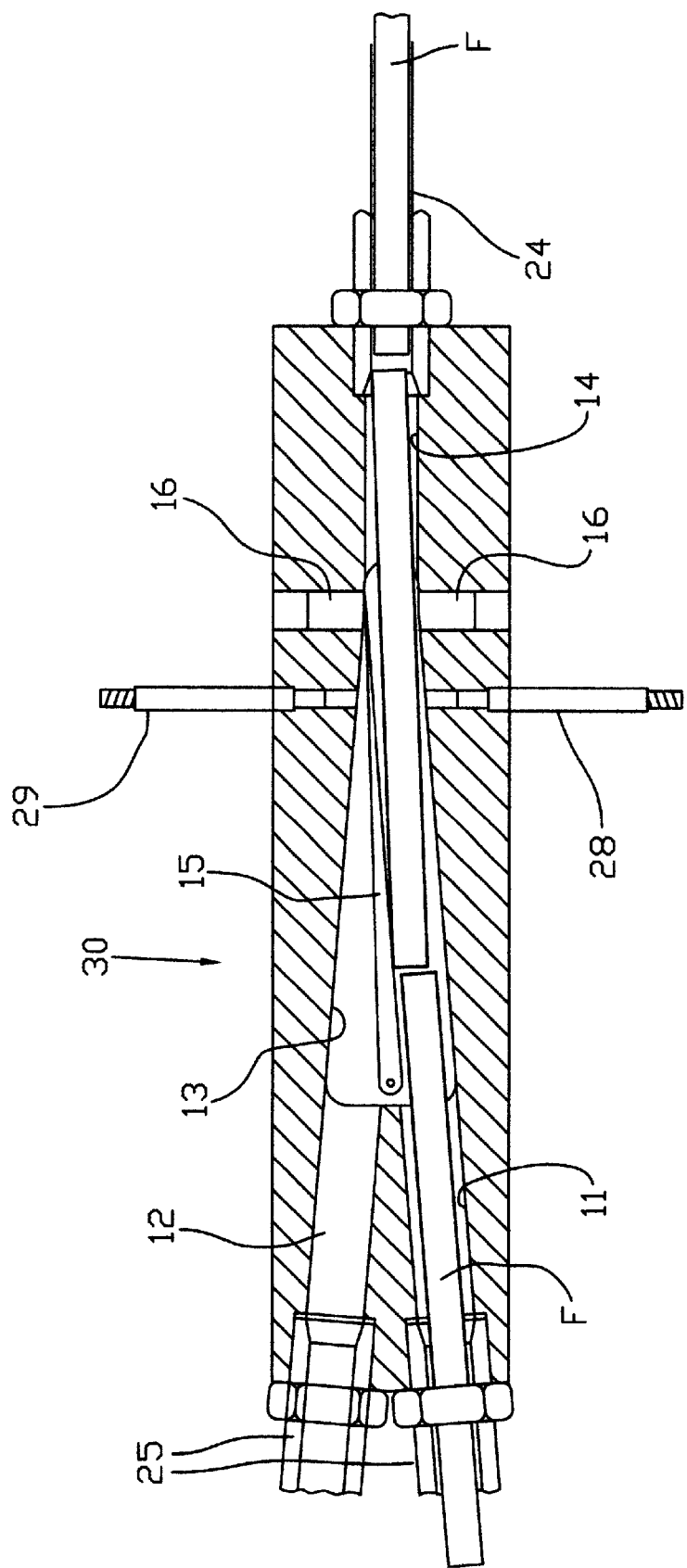
Figure 4:
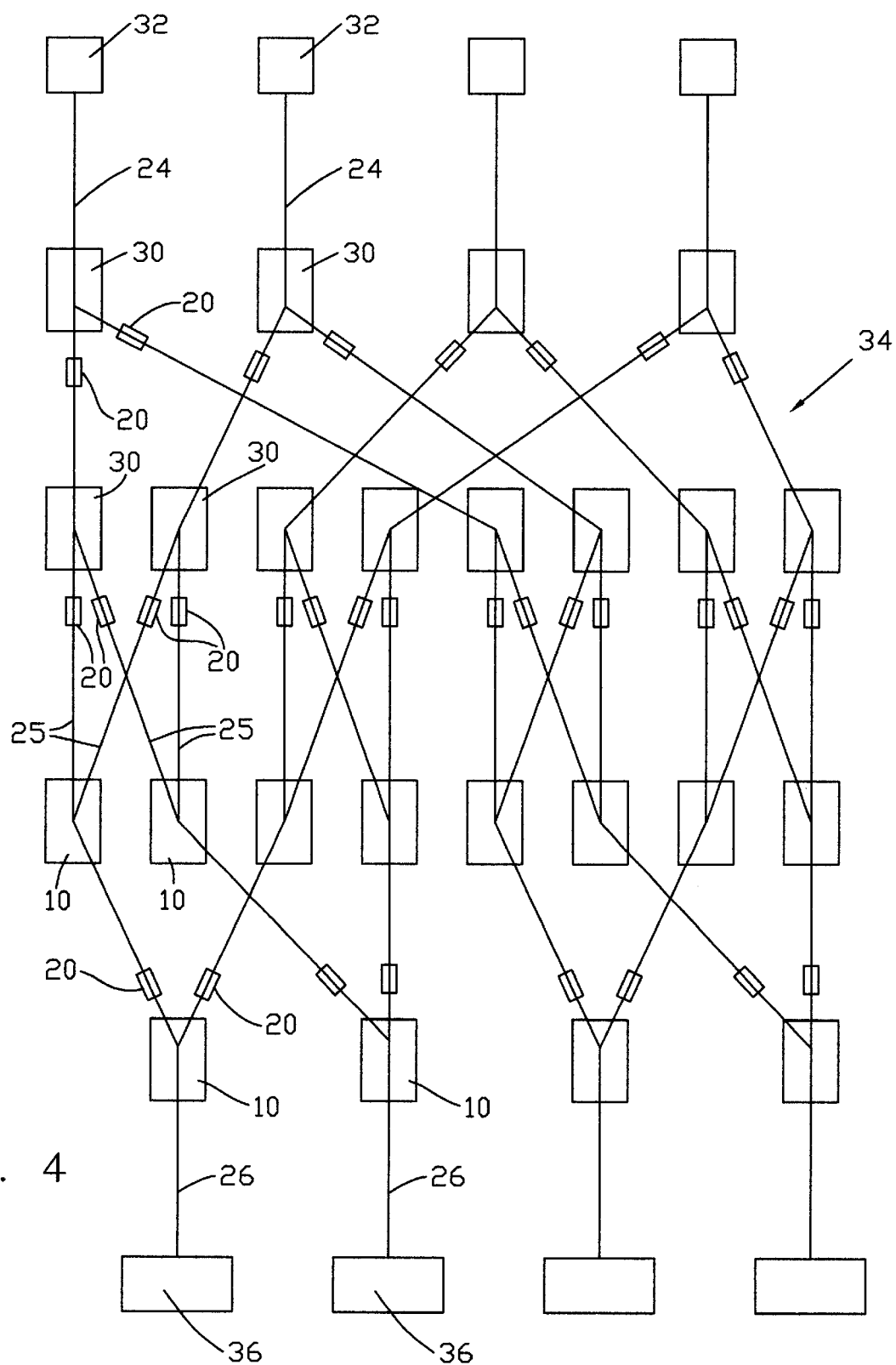

An embodiment of the invention will be explained in greater detail below with reference to the drawings. The following is shown:

FIG. 1 a cross section of a passive interchange,
FIG. 2 a cross section of the shut-off valve,
FIG. 3 a cross section of an active interchange and
FIG. 4 a schematic view of an interchange segment.

According to FIG. 1, a passive interchange 10 has two branch tubes 11, 12 that join together at an acute angle in an interchange chamber 13 to form a main tube 14. Since this is a passive interchange, the branch tubes 11, 12 are inlet tubes and the main tube 14 is an outlet tube. The interchange chamber 13 extends from the point where the two branch tubes meet all the way to the main tube 14. At the place where the two branch tubes 11, 12 meet, a flap 15 is supported so as to swivel at one of its ends. The flap 15 extends inside the interchange chamber 13 all the way to the start of the main tube 14. The flap 15 can be swiveled around an axis 17 between two positions in each of which it creates a connection between one of the two branch tubes 11, 12 and the main tube 14, i.e. it opens up the passage from this branch tube 11 or 12 to the main tube 14, while it blocks off the other branch tube 12 or 11 from the main tube 14, i.e. it closes the passage from this branch tube 15 or 11 to the main tube 14. In the position shown in FIG. 1, the first branch tube 11 is in use, i.e. the products are being pneumatically conveyed therein. Therefore, the flap 15 establishes the connection between this branch tube 11 and the main tube 14.

When the branch tube 12 is in use, the flap 15 is passively switched over into the other position by the overpressure then prevailing in this branch tube 12 and by the product stream. In order to make this passive switch-over possible, the flap 15 intentionally has a great deal of play.

In order to hold the flap 15 securely in one of the two positions, permanent magnets 16 are arranged laterally in the tube wall at the end of the interchange chamber 13, and said permanent magnets 16 hold the free end of the flap 15 with a defined force. The holding force is dimensioned in such a way that, when a switch-over is made between the branch tubes 11 and 12, the air pressure prevailing in the branch tube 11 or 12 that is now in use is capable of passively switching over the flap 15. Instead of the permanent magnets 16, another type of bistable switch-over mechanism can be provided that acts, for example, on the axis 17 of the flap 15.

The interchange 10 described above is especially suitable for a conveying system through which cigarette filter plugs are conveyed from several filter plug makers to one of several filter assemblers. The branch tubes 11, 12 are each connected to one filter plug maker via feeding conveying segments 25, and the main tube 14 is connected to a filter assembler via a discharging conveying segment 26. The main tube 14 can also be connected via an intermediate conveying segment to the branch tube 11, 12 of another interchange 10, whereby in principle, any desired number of interchanges 10 can be arranged consecutively, so that all in all, the filter plugs from a large number of filter plug makers can be fed to one specific filter assembler, exclusively by controlling the flap of the interchange by means of the product stream.

In order to prevent pressure losses via the conveying segment 25 that is not in use at a given time and to prevent an unintentional simultaneous conveying of filter plugs through two conveying segments 25 that lead to the same interchange 10, shut-off valves 20 according to FIG. 2 are provided in the incoming conveying segments 25, whereby the shut-off valve 20 is closed in the conveying segment 25 that is not in use at a given time.

The shut-off valve 20 consists of a block 21 through which there is a conveying segment 25. A valve insert 22 is rotatably arranged in a borehole positioned crosswise to this. A borehole 23 having the same diameter as the conveying segment 25 extends through the valve insert 22. By rotating the valve insert 22, the borehole 23 can be aligned with the conveying segment 25, so that the shut-off valve 20 is open. On the other hand, if the valve insert 22 is rotated by 90°, then the shut-off valve 20 is closed. In addition to the block 21, the valve insert 22 also has suitable control elements that are of a conventional design, which is why they are not shown here.

FIG. 3 shows an embodiment of an active interchange 30. The two branch tubes 11, 12 are outlet tubes and the main tube 14 is an inlet tube for the product stream, e.g. filter plugs F. As was the case with the embodiment of the passive interchange of FIGS. 1 and 2, here too, the tip of the flap 15 is held by permanent magnets 16 against the wall of the interchange chamber 13 in one of the two end positions. In addition to the permanent magnets 16, there are pneumatic control cylinders 28, 29 that are located in the boreholes of the wall of the interchange chamber 13 and that move against the force of a return spring when subjected to a short surge of pressurized air, as a result of which said cylinders engage with the tip of the flap 15 and switch over the flap 15 so that the filter plugs F are redirected into the other of the two branch tubes 11, 12. The conveying segments 25 that follow the branch tubes 11, 12, in turn, contain shut-off valves 20 for purposes of blocking off the conveying segment 25 through which no filter plugs F are moving at that time so as to prevent pressure losses.

FIG. 4 schematically shows an interchange segment of a conveying system used to pneumatically convey filter plugs.

The filter plugs are conveyed from four filter plug makers and filter feed devices 32 through conveying segments 24 to the interchange segment 30. There the plugs are redirected by means of active interchanges 30 configured in two consecutive stages into one of sixteen conveying segments 25 and then, in turn, by means of passive interchanges 10 configured in two consecutive stages, into one of four conveying segments 26 leading to a cigarette machine 36. There is a shut-off valve 20 installed in each of the conveying segments 25.

FIG. 4 only schematically shows an interchange segment 34 by means of which the filter plugs coming from four conveying segments 24 of four filter feed devices 32 can be fed to one of four cigarette machines 36. In actual practice, the number of filter plug makers and the number of cigarette machines can be much larger.

What is claimed is:

1. An apparatus for conveying filter plugs from a plurality of filter plug makers to at least one filter assembler during cigarette production, comprising
    a plurality of filter plug makers connected to a plurality of conveying segments leading to at least one filter assembler, and
    at least one interchange joining the plurality of conveying segments together between the plurality of filter assemblers and filter plug makers, said interchange comprising
        a plurality of branch tubes joined together at an acute angle in an interchange chamber to form a main tube each of said branch tubes and said main tube connected to one of said conveying segments, and
        a flap positioned between at least two branch tubes of said plurality of branch tubes at the end of the interchange chamber, said flap facing said branch tubes and swivelable between a first position and a second position, said flap being held in each position by a holding device comprised of at least one magnet located within opposing sidewalls of said interchange chamber, whereby when the flap is positioned in the first position there is a connection between a first branch tube and the main tube, and when the flap is positioned in a second position there is a connection between a second branch tube and the main tube
    whereby conveying segments extending from the filter plug makers are joined together to form one single conveying pathway leading to the filter assembler.

2. A conveying system according to claim 1, further comprising a shut-off valve in at least one of the conveying segments.

3. A conveying system for conveying filter plugs from a plurality of filter plug makers to a plurality of filter assemblers during cigarette production, comprising:
    a plurality of filter plug makers, each connected by a plurality of respective conveying segments to a plurality of filter assemblers, and
    an active interchange comprising
        a plurality of branch tubes joined together at an acute angle in an interchange chamber to form a main tube each of said branch tubes and said main tube connected to one of said conveying segments, and
        a flap positioned between at least two branch tubes of said plurality of branch tubes at the end of the interchange chamber, said flap facing said branch tubes and swivelable between a first position and a second position, said flap being held in each position by a holding device comprised of at least one magnet located within opposing sidewalls of said interchange chamber, whereby when the flap is positioned in the first position there is a connection between a first branch tube and the main tube, and when the flap is positioned in a second position there is a connection between a second branch tube and the main tube.

4. A conveying system as claimed in claim 3, wherein at least one of the conveying segments extending from the filter plug makers branches off to form several conveying segments.

5. An conveying system as claimed in claim 4, further comprising a passive interchange joining together one of the several conveying segments formed by the branches together with other conveying segments to form one single conveying pathway leading to at least one of the plurality of filter assemblers.

6. A conveying system according to claim 3, further comprising a shut-off valve in at least one of the conveying segments.

7. A conveying system for conveying filter plugs during cigarette production, comprising
- a plurality of filter plug makers, each connected by a plurality of respective conveying segments to a plurality of filter assemblers, and
- a plurality of active and passive interchanges interconnecting said conveying segments between said filter plug makers and said filter assemblers, each of said interchanges comprising
  - a plurality of branch tubes joined together at an acute angle in an interchange chamber to form a main tube each of said branch tubes and said main tube connected to one of said conveying segments, and
  - a flap positioned between at least two branch tubes of said plurality of branch tubes at the end of the interchange chamber, said flap facing said branch tubes and swivelable between a first position and a second position, said flap being held in each position by a holding device comprised of at least one magnet located within opposing sidewalls of said interchange chamber, whereby when the flap is positioned in the first position there is a connection between a first branch tube and the main tube, and when the flap is positioned in a second position there is a connection between a second branch tube and the main tube.

* * * * *